US011979542B2

(12) United States Patent
Uragaki (10) Patent No.: US 11,979,542 B2
(45) Date of Patent: May 7, 2024

(54) IMAGE PROCESSING APPARATUS AND METHOD OF CONTROLLING AN IMAGE PROCESSING APPARATUS FOR CENSORSHIP PROCESSING (71) Applicant: CANON KABUSHIKI KAISHA, Tokyo (JP)

(72) Inventor: Takeshi Uragaki, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/055,085

(22) Filed: Nov. 14, 2022

(65) Prior Publication Data
US 2023/0156140 A1 May 18, 2023

(30) Foreign Application Priority Data
Nov. 18, 2021 (JP) .................. 2021-187835

(51) Int. Cl.
H04N 1/44 (2006.01)
G06F 3/12 (2006.01)
G06F 21/60 (2013.01)
H04N 1/00 (2006.01)

(52) U.S. Cl.
CPC ........... H04N 1/444 (2013.01); G06F 3/1238 (2013.01); G06F 21/608 (2013.01); H04N 1/00214 (2013.01); H04N 1/00233 (2013.01); H04N 1/00244 (2013.01); H04N 1/00864 (2013.01); H04N 1/4446 (2013.01); H04N 1/00331 (2013.01); H04N 2201/0094 (2013.01)

(58) Field of Classification Search
CPC .. H04N 1/444; H04N 1/00214; H04N 1/4446; H04N 1/00331; G06F 21/608
See application file for complete search history.

(56) References Cited

U.S. PATENT DOCUMENTS

2009/0044254 A1* 2/2009 Tian ................. G06Q 10/06
726/4
2021/0042070 A1* 2/2021 Nagano ................ G06F 3/1222

FOREIGN PATENT DOCUMENTS

JP H08194412 A 7/1996
JP 2010266940 A 11/2010

* cited by examiner

Primary Examiner — Peter K Huntsinger
(74) Attorney, Agent, or Firm — Canon U.S.A., Inc. IP Division (57) ABSTRACT An image processing apparatus is communicable with a system including a censorship function, and includes one or more controllers having one or more processors and one or more memories, and the one or more controllers are configured to transmit an image acquired by reading a display medium to the system, receive a censorship result from the system, and control the image processing apparatus to perform a predetermined operation corresponding to the received censorship result, wherein the predetermined operation is a preset operation to be performed by the image processing apparatus based on the received censorship result.

13 Claims, 11 Drawing Sheets

| CENSORSHIP SETTING | USER AUTHORITY | TRANSMISSION DESTINATION AFTER SCAN | CENSORSHIP RESULT | TRANSMISSION |
|---|---|---|---|---|
| NOT CENSORED | — | — | — | TRANSMITTABLE |
| CENSORED | GENERAL STAFF | CLOUD SERVICE | HIGH | UNTRANSMITTABLE |
| CENSORED | MANAGERIAL POST | CLOUD SERVICE | HIGH | TRANSMITTABLE |
| CENSORED | GENERAL STAFF | E-Mail | HIGH | UNTRANSMITTABLE |
| CENSORED | MANAGERIAL POST | E-Mail | HIGH | UNTRANSMITTABLE |
| CENSORED | GENERAL STAFF | CLOUD SERVICE | MIDDLE | UNTRANSMITTABLE |
| CENSORED | MANAGERIAL POST | CLOUD SERVICE | MIDDLE | TRANSMITTABLE |
| CENSORED | GENERAL STAFF | E-Mail | MIDDLE | UNTRANSMITTABLE |
| CENSORED | MANAGERIAL POST | E-Mail | MIDDLE | TRANSMITTABLE |
| CENSORED | GENERAL STAFF | CLOUD SERVICE | LOW | TRANSMITTABLE |
| CENSORED | MANAGERIAL POST | CLOUD SERVICE | LOW | TRANSMITTABLE |
| CENSORED | GENERAL STAFF | E-Mail | LOW | TRANSMITTABLE |
| CENSORED | MANAGERIAL POST | E-Mail | LOW | TRANSMITTABLE |

IMAGE PROCESSING APPARATUS AND METHOD OF CONTROLLING AN IMAGE PROCESSING APPARATUS FOR CENSORSHIP PROCESSING

BACKGROUND

Field of the Disclosure

The present disclosure relates to an image processing apparatus, a method of controlling the image processing apparatus, an image processing system, and a storage medium.

Description of the Related Art

In recent years, occurrence of information leakage and attack by fraudulent operation have become problems both inside and outside a company. Accordingly, a security model is changed from a perimeter model in which an inside of a firewall is safe to a zero-trust model based on concept of never trust, always verify. An information processing apparatus, for example, an image forming apparatus includes various functions, and includes a data transmission function and a communication function to an external storage, for example, a scan data transmission function, a facsimile (FAX) function, and a stored document transmission function. In the zero-trust security model, it is necessary to doubt everything. For this reason, it is important to constantly verify that data to be exchanged does not lead to information leakage and is not fraudulently operated.

As a method of verifying scan data to prevent execution of fraudulent operation, Japanese Patent Application Laid-Open No. H8-194412 discusses a technique to check (censor) whether a text extracted by performing character string extraction (optical character recognition (OCR)) on a scan document is coincident with a character string or a position previously registered. This enables verification of data with a smaller memory amount than a memory amount for a comparison using an image, which makes it possible to prevent unauthorized copy of securities.

Japanese Patent Application Laid-Open No. 2010-266940 discusses a technique to censor data stored in an information disclosure server and to determine disclosure/nondisclosure based on a result of the censorship. The technique makes it possible to appropriately conceal data that should not be disclosed such as copyrighted material.

SUMMARY

According to an aspect of the present disclosure, an image processing apparatus is communicable with a system including a censorship function, and includes one or more controllers having one or more processors and one or more memories, and the one or more controllers are configured to transmit an image acquired by reading a display medium to the system, receive a censorship result from the system, and control the image processing apparatus to perform a predetermined operation corresponding to the received censorship result, wherein the predetermined operation is a preset operation to be performed by the image processing apparatus based on the received censorship result.

Further features of the present disclosure will become apparent from the following description of exemplary embodiments with reference to the attached drawings.

DESCRIPTION OF THE EMBODIMENTS

A first exemplary embodiment of the present disclosure is to be described with reference to drawings.

Figure 1:
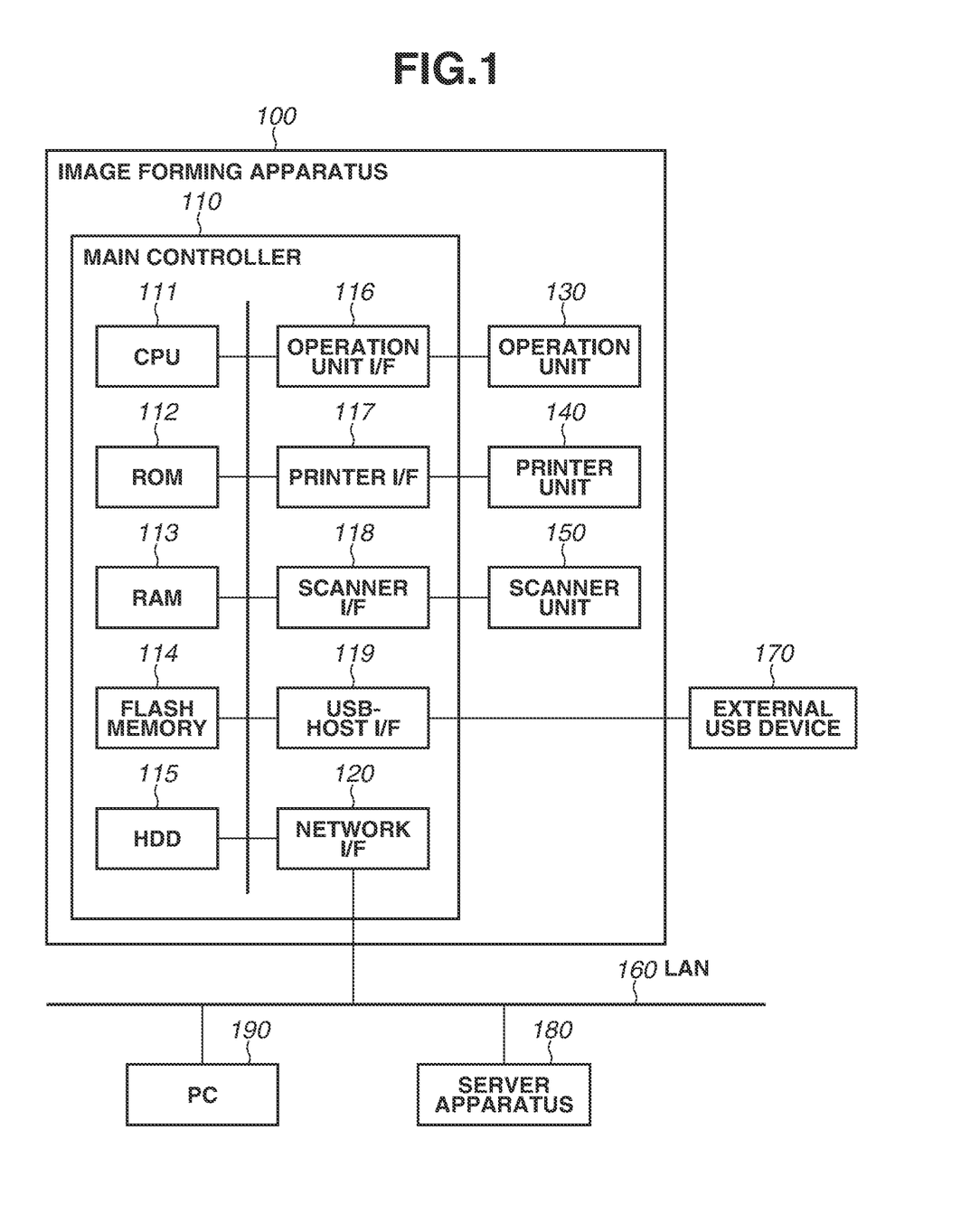
FIG. 1 is an exemplary block diagram illustrating an entire configuration of an information processing system.

FIG. 1 is a block diagram illustrating an entire configuration of an information processing system including an information processing apparatus according to the exemplary embodiment of the present disclosure. As the information processing apparatus, an image forming apparatus 100 is exemplified. The information processing apparatus is, however, not limited to the image forming apparatus. The image forming apparatus 100 is, for example, a multifunctional peripheral (MFP) or an image processing apparatus. In FIG. 1, a block diagram illustrating hardware of the image forming apparatus 100 is illustrated.

The information processing system is configured by communicably connecting the image forming apparatus 100 to a server apparatus 180 and a personal computer (PC) 190 via a local area network (LAN) 160. The image forming apparatus 100 includes a main controller 110, an operation unit 130, a printer unit 140, and a scanner unit 150.

In the main controller 110, a central processing unit (CPU) 111 reads out programs for the main controller 110 stored in a read only memory (ROM) 112 and a flash memory 114 to a random access memory (RAM) 113 and executes the programs. The ROM 112 stores a boot program, a basic input/output system (BIOS), fixed parameters, and the like for the main controller 110. The RAM 113 is used to store the programs, temporary data, and the like when the CPU 111 controls the main controller 110. The flash memory 114 stores a loader, a kernel, and applications. The flash memory 114 stores, in addition to execution programs, license information to enable functions of the image forming apparatus 100, and a signature and a public key used to detect falsification of the programs.

A hard disk drive (HDD) 115 stores some applications, various kinds of data, print data received from the PC 190 via a network interface (I/F) 120, and the like. The programs that are read out from the flash memory 114 and executed by the CPU 111 include a print application program. The print application program converts the print data stored in the HDD 115 into image data printable by the printer unit 140, and the image data is also stored in the HDD 115.

Firmware that is read out from the flash memory 114 and executed by the CPU 111 includes a scan application program. The scan application program causes a scanner unit 150 to read image data, and transfers the read image data to the HDD 115. The read image data is stored in the HDD 115. For example, image data is acquired when the scanner unit 150 reads a sheet. Examples of the image processing apparatus include a smartphone including a camera. Image data acquired by capturing an image of a sheet and an image of a display unit of an electronic apparatus by the camera can also be to be processed.

An operation unit I/F 116 is an interface to transmit, to the CPU 111, an instruction input by a user of the image forming apparatus 100 through the operation unit 130. The operation unit I/F 116 receives processing contents to switch contents to be displayed on the operation unit 130, from the CPU 111, and transmits the processing contents to the operation unit 130. The operation unit 130 includes a liquid crystal display unit having a touch panel function, a keyboard, and the like, displays a state of the image forming apparatus 100 and an operation menu, and receives an instruction from the user.

A printer I/F 117 is an interface to connect the main controller 110 and the printer unit 140. The printer unit 140 performs printing on a recording medium based on image data transferred from the HDD 115 through the printer I/F 117.

A scanner I/F 118 is an interface to connect the main controller 110 and the scanner unit 150. The scanner unit 150 reads an image on a document as image data by using a line sensor including a charge coupled device (CCD). The scanner unit 150 transfers the read image data to the HDD 115 through the scanner I/F 118. The stored image can be printed by the printer unit 140. The printer unit 140 can perform copy processing by printing the image data read by the scanner unit 150.

A universal serial bus (USB)-Host I/F 119 is an interface to connect the main controller 110 and an external USB device 170. Examples of the external USB device include a facsimile (FAX) unit. In the example of the FAX unit, the external USB device 170 performs FAX transmission based on image data transferred from the HDD 115 through the USB-Host I/F 119. The external USB device 170 generates image data based on the received data, and transfers the image data to the HDD 115 through the USB-Host I/F 119. The image data stored in the HDD 115 is printed on the recording medium by the printer unit 140 in the above-described manner. Other examples of the external USB device 170 include a USB memory and a USB keyboard. An update file necessary for updating firmware can be transferred from the USB memory.

The network I/F 120 connects the main controller 110 to the LAN 160, and communicates with the PC 190 on the LAN 160. The PC 190 is connected to the image forming apparatus 100 through the LAN 160, and can perform transmission of print data, operation of the image forming apparatus 100 through a web browser, transfer of the firmware file, and the like, to the image forming apparatus 100. Further, the image forming apparatus 100 is connected to the server apparatus 180 through the LAN 160, and the server apparatus 180 can be set as a transmission destination of scan data and various kinds of logs. A transmission protocol in this example is a simple mail transfer protocol (SMTP), a file transfer protocol (FTP), or the like, but the protocol is not limited to the example.

The image forming apparatus 100 can use the server apparatus 180 as a storage in which necessary setting and data are stored. Depending on an environment where the image forming apparatus 100 is installed, however, the image forming apparatus 100 may not be connected to the server apparatus 180. The server apparatus 180 is similarly usable even when the server apparatus 180 includes a cloud service or the like.

A data censorship function to perform scan data censorship processing is to be described.

Figure 2:
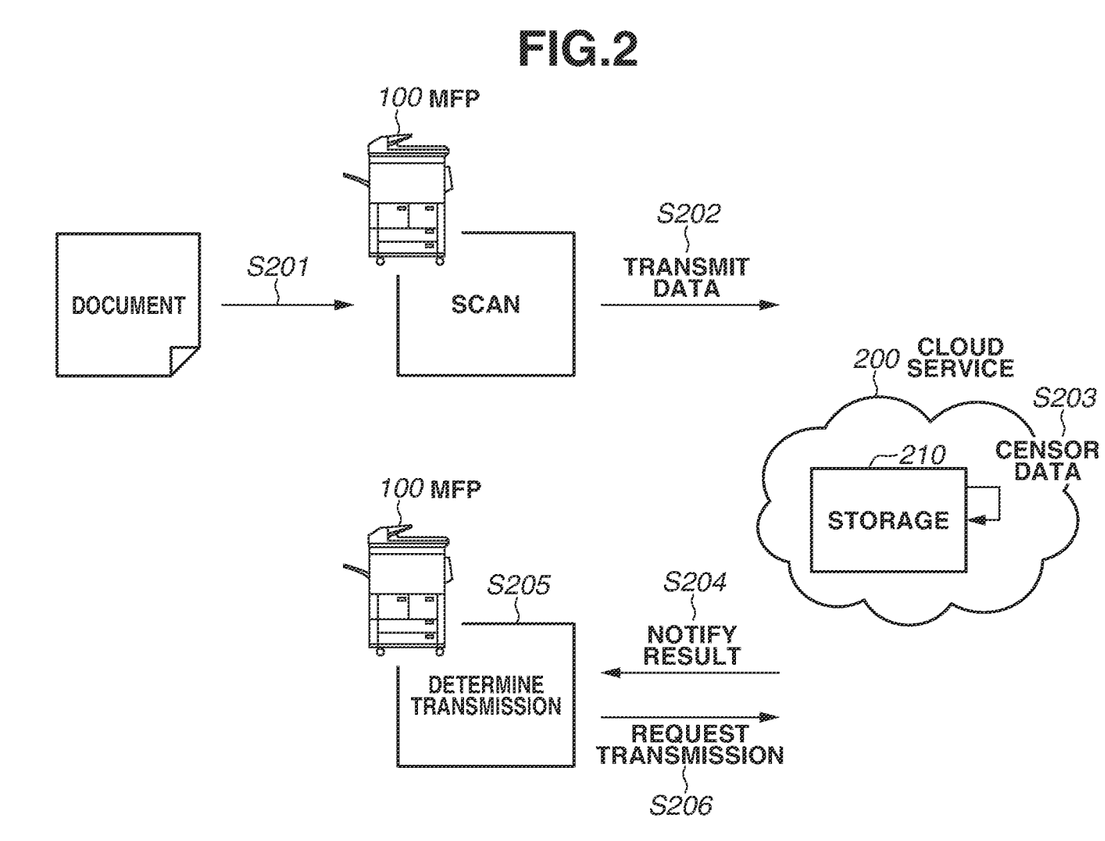
FIG. 2 is an exemplary diagram illustrating an outline of censorship processing.

FIG. 2 is a diagram illustrating an outline of the data censorship function using a cloud service. In the present exemplary embodiment, the cloud service providing the data censorship function is a system having the censorship function.

It is assumed that a cloud service 200 is present in the server apparatus 180 in FIG. 1. In FIG. 2, the cloud service 200 is present in the server apparatus 180, but the cloud service 200 may be formed of a plurality of servers.

In step S201, in a case where the image forming apparatus 100 receives a job requiring execution of scan, for example, copy, scan transmission, FAX transmission, or BOX storage, the processing proceeds to step S202.

In step S202, the image forming apparatus 100 once transmits scan data to the cloud service 200 in order to censor contents of the scan data.

In step S203, the cloud service 200 temporarily stores the received scan data in a storage 210, and performs censorship processing based on censorship keywords previously registered by an administrator or the user.

The cloud service 200 provides, as one of services, a mechanism of data censorship (data loss prevention (DLP)). The data censorship (DLP) is a service to enable determination whether any of previously registered censorship keywords is not included in text data, and to enable concealing, deletion, and the like of a confidential information portion. For example, a case where a telephone number is set as the censorship keyword is specifically to be described as an example.

First, on the cloud service, a setting is made to perform any control on data including a telephone number. Various contents of the control are settable, for example, the number of telephone numbers included in the data is notified as alerts of a plurality of stages to a previously registered administrator, or the data is converted into data in which the telephone number is hidden with black paint.

At a timing when the data is stored in the cloud service or at a timing when the censorship is instructed, contents of the stored data are checked. In a case where the censorship keyword is the telephone number, it is determined whether the telephone number is described in the data, by searching for, for example, a combination of the predetermined number of numerals and symbols.

In a case where it is determined that the telephone number is included in the data, control is performed based on the preset contents.

Types of the censorship keywords that can be determined in the DLP, contents of the settable control, and a method of checking the contents of data are varied depending on the cloud service providing the service, and are not limited.

In step S204, the image forming apparatus 100 is notified of a result of the censorship processing. In a case where the censorship keywords are not included in the scan data, the image forming apparatus 100 is notified of a severity "low" as the result of the censorship processing. In a case where a keyword similar to any of the censorship keywords is included, the image forming apparatus 100 is notified of a severity "middle" as the result of the censorship processing. In a case where any of the censorship keywords is included, the image forming apparatus 100 is notified of a severity "high". The image forming apparatus 100 may be notified of the result of the censorship processing while the result is subdivided into a plurality of levels based on certainty whether any of the censorship keywords is included, the number of times of appearance of the keywords, or the like.

In step S205, the image forming apparatus 100 determines whether the scan data is actually transmittable based on the result of the censorship processing, user information managed by the image forming apparatus 100, information on a transmission destination of the scan data, and the like. In a case where the image forming apparatus 100 determines that the scan data is transmittable, the image forming apparatus 100 transmits the scan data to a transmission destination designated by the user, for example, the PC 190 in step S206. It is assumed that the transmission destination of the scan data is designated by, for example, a mail address or a telephone number, but the scan data may be transmitted to a designated talk room of a chat application or the like.

As a result, it is possible to prevent leakage of confidential information and to realize access control in fine units corresponding to the user access authority, by censoring the contents of the scan data.

Figure 3:
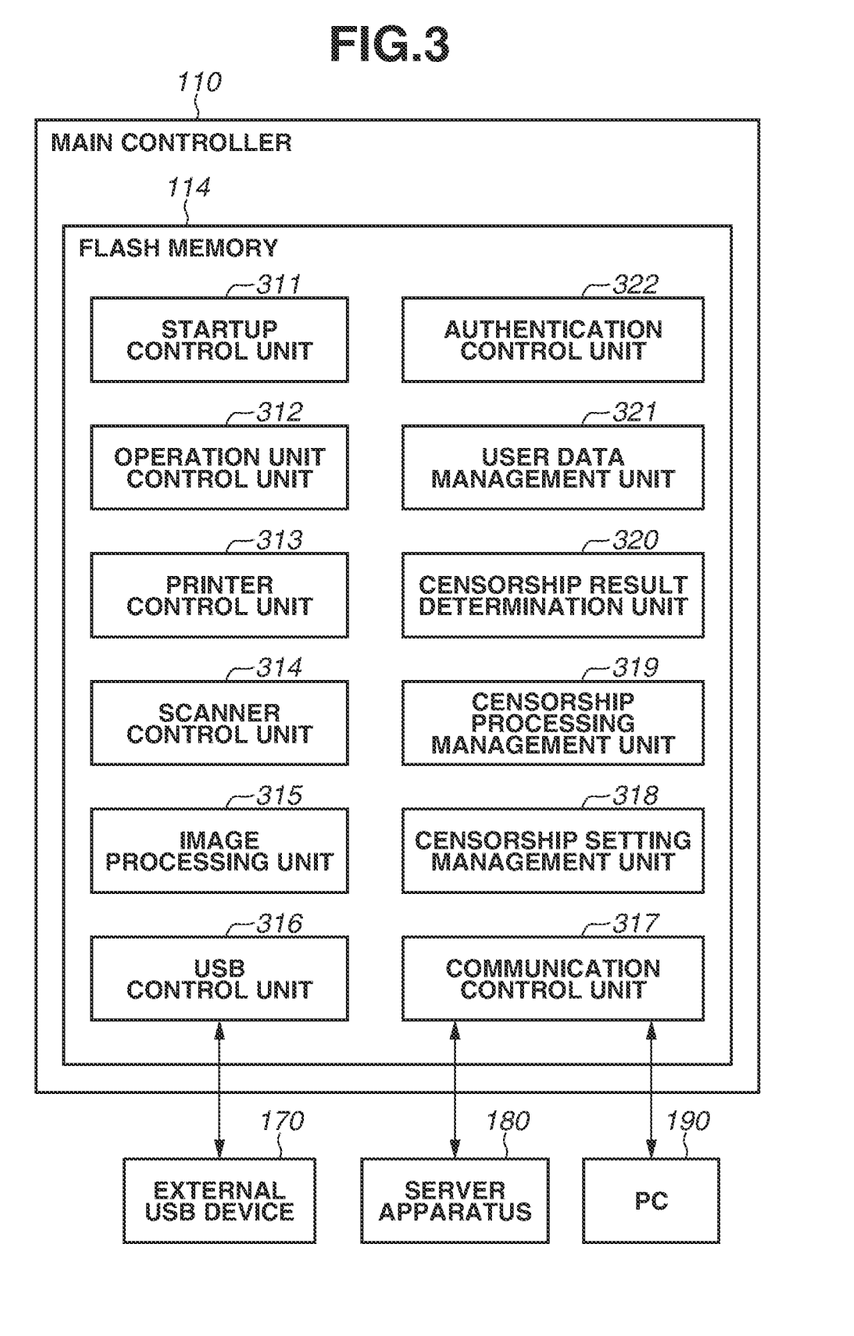
FIG. 3 is an exemplary functional block diagram of a main controller.

FIG. 3 is a functional block diagram of the main controller 110. A configuration of software executed by the CPU 111 of the main controller 110 is to be described with reference to FIG. 3. Programs illustrated in FIG. 3 are stored in the flash memory 114. Functional units illustrated in FIG. 3 are mainly realized by cooperation of the CPU 111, the flash memory 114, and the RAM 113.

A startup control unit 311 is a program for controlling processing at startup of the image forming apparatus 100. The startup control unit 311 starts up an operating system (OS) of the main controller 110, and activates a basic system to operate various kinds of programs. An operation unit control unit 312 is a program for controlling the operation unit 130 through the operation unit I/F 116. A printer control unit 313 is a program for controlling the printer unit 140 through the printer I/F 117. A scanner control unit 314 is a program for controlling the scanner unit 150 through the scanner I/F 118.

An image processing unit 315 performs image processing on the scan data received through the scanner control unit 314.

A USB control unit 316 is a program for controlling the external USB device 170 through the USB-Host I/F 119. A communication control unit 317 communicates with the server apparatus 180 and the PC 190 through the network I/F 120. The communication is performed through the LAN 160, and transmission of the scan data and transfer of setting data necessary for censorship of the data are performed. The transferred file is stored in the HDD 115.

A censorship setting management unit 318 manages a setting value (on/off of censorship mode) indicating whether execution of the censorship is necessary at the time of scanning. The censorship setting management unit 318 receives a setting necessary for execution of the censorship from the user, and stores the setting in the HDD 115. A setting screen to receive the setting necessary for execution of the censorship may be displayed on the operation unit 130 through the operation unit control unit 312, or may be provided by a web server function, to enable the user to perform operation in a web browser mounted on the PC 190. The censorship setting management unit 318 stores the received setting value in the HDD 115, and provides the setting value when a censorship processing management unit 319 causes the cloud service to execute the censorship.

The censorship processing management unit 319 transmits the scan data scanned by the scanner control unit 314 to the data censorship service 400, and causes the data censorship service 400 to censor the data. The processing request to the cloud service 200 is performed by a communication control unit 317 by using a representational state transfer application programmable interface (REST API). The request may be realized by a simple object access protocol (SOAP).

A censorship result determination unit 320 is notified of the received censorship result.

In a case where it is determined as a result of the censorship that contents of the scan data include any of the censorship keywords prohibited from being transmitted, the censorship result determination unit 320 further checks user authority and a transmission destination of the scan data.

The censorship result determination unit 320 determines whether the scan data is transmittable, from these conditions based on a determination table held by the censorship setting management unit 318 to be described below. In a case where it is determined that the scan data is not transmittable, an error notification is transmitted.

The error notification is transmitted to, for example, the operation unit 130 and an external apparatus connected to the LAN 160, to notify the user of an error in the censorship.

A user data management unit 321 manages data on individual user. The data to be managed includes a destination table to be used for FAX and the like, scan data stored in the cloud service 200, and various kinds of setting values.

An authentication control unit 322 manages authentication information on each user, and receives authentication operation to use the image forming apparatus 100. The data associated with the authority can be read out from the user data management unit 321 based on the authentication information authenticated by the authentication control unit 322.

Figure 4:
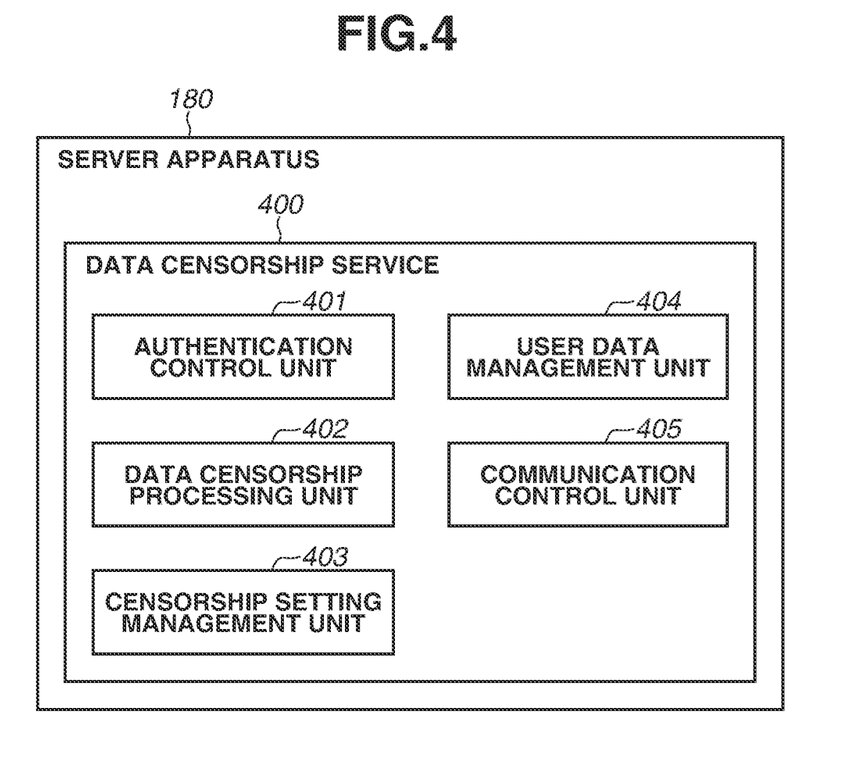
FIG. 4 is an exemplary functional block diagram of a server apparatus.

A software configuration of the data censorship service 400 to be used for censorship of the scan data is to be described with reference to FIG. 4.

The data censorship service 400 as a cloud service that can perform data censorship operates in the server apparatus 180. An authentication control unit 401 performs user management and authentication for use of the data censorship service 400. The data censorship service 400 can be directly accessed by using a web browser mounted on the PC 190. In this case, authentication is also performed by the authentication control unit 401.

A data censorship processing unit 402 censors the scan data transmitted from the censorship processing management unit 319 of the image forming apparatus 100. The censorship may be performed based on the censorship keywords designated when the processing request is received from the image forming apparatus 100, or the censorship keywords may be previously set in a censorship setting management unit 403.

The censorship setting management unit 403 manages settings of the censorship keywords and censorship algorithm necessary for the censorship.

A user data management unit 404 manages the scan data transmitted from the image forming apparatus 100.

A communication control unit 405 performs communication with the image forming apparatus 100, and functions as a web server.

Document scan processing and scan data censorship processing are to be described with reference to FIGS. 5A and 5B and FIGS. 6A and 6B.

Figure 5A:
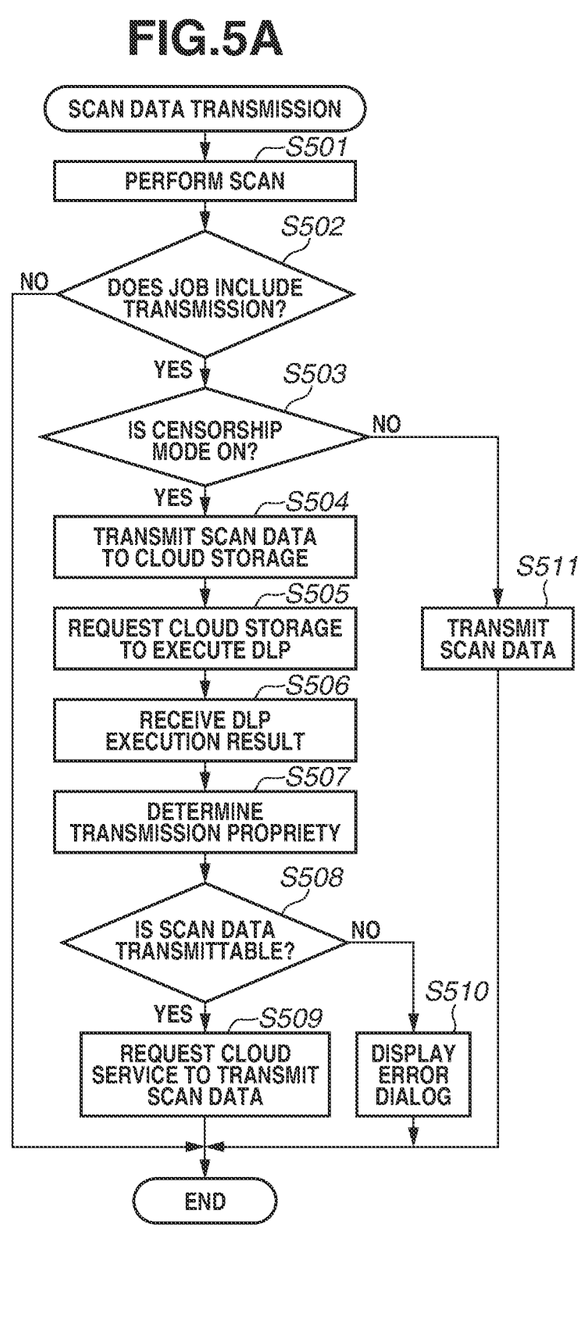
FIGS. 5A and 5B are exemplary flowcharts illustrating scan processing and data censorship processing.

FIG. 5A is a flowchart illustrating scan transmission processing performed by the image forming apparatus 100. Operation of the image forming apparatus 100 is an example of the operation according to the present exemplary embodiment. The processing is realized when the CPU 111 loads programs stored in the flash memory 114 to the RAM 113, and executes the programs. The processing starts when a job requiring scan is input. As the job requiring scan, a copy job, a scan transmission job, a FAX transmission job, a BOX storage job, and the like are considered. In a case of the transmission job, a transmission destination is designated when the job is input.

Before processing of the job requiring scan starts, the CPU 111 determines user authority of a login user of the image forming apparatus 100. The determination may be performed by acquiring information from an authentication server (not illustrated), or may be performed by a unit registering the user authority of the login user of the image forming apparatus 100 in an operation setting management table or the like.

In step S501, the scanner control unit 314 reads a display medium such as a document printed on a sheet by using the scanner unit 150, and the image processing unit 315 makes a read result into data.

In step S502, it is checked whether the job requiring scan performed in step S501 is a job including transmission. More specifically, the check may be performed based on whether a transmission destination has been designated, but the checking method is not limited the above example. As the job including transmission, for example, a scan transmission job and a FAX transmission job are considered. In a case where the job includes transmission (YES in step S502), the processing proceeds to step S503. In a case where the job does not include transmission, for example, a copy job or a BOX storage job (NO in step S502), the processing of the flowchart ends. This is because it is expected that, in a case of the copy job, the censorship is performed when copy is performed, and in a case of the BOX storage job, the censorship is performed when printing is performed by using the scan data stored in a BOX after the scan data is stored in the BOX.

For example, as described above, it is assumed that the censorship is set to a specific storage area on the cloud service.

In step S503, the censorship setting management unit 318 checks whether a censorship mode is on. In a case where the censorship mode is on (YES in step S503), the scan data is transmitted to the cloud storage in step S504, in order to perform the data censorship. In a case where the censorship mode is off (NO in step S503), the scan data is transmitted in step S511, based on transmission setting set by the user when the scan is performed. In step S504, the censorship processing management unit 319 logs in to the data censorship service 400, and transmits the scan data to a data storage area.

In step S505, the censorship processing management unit 319 requests the data censorship service 400 to execute the censorship (DLP). At this time, the censorship setting previously set in the censorship setting management unit 318 is also notified. As the request, a request using an API released on the cloud service is assumed. For example, information on the execution request based on a specific API is transmitted from the image forming apparatus 100 to the server apparatus 180. The API may collectively instruct the processing in steps S504 and S505. For example, the above-described set specific area is designated in a command of the API. The command is an example of the execution request.

In step S506, a result of the censorship by the data censorship service 400 is received.

In step S507, the censorship result determination unit 320 determines transmission propriety of the scan data based on the censorship result received in step S506, the user authority, and the like.

In step S508, it is determined whether the scan data is transmittable. In a case where the scan data is transmittable (YES in step S508), the scan data is transmitted in step S509. In a case where it is determined that the scan data is not transmittable (NO in step S508), occurrence of an error is displayed on the operation unit 130 in step S510.

In step S510, the censorship result determination unit 320 performs notification processing. In the notification processing, as illustrated in FIG. 6A, the censorship result determination unit 320 displays an error screen 600 on the operation unit 130 by using the operation unit control unit 312.

Figure 6A:
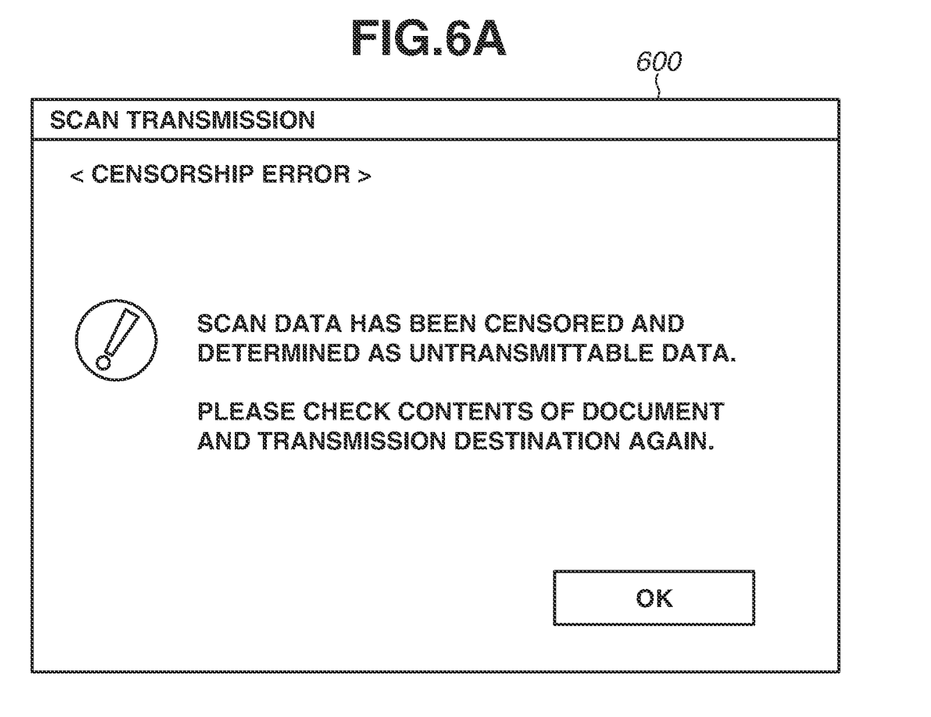
FIGS. 6A and 6B are exemplary diagrams each illustrating an example of an error screen.

FIG. 6A is a diagram illustrating an example of the error screen 600. In the error screen 600, an error massage is displayed, which notifies the user that the current censored data is not transmittable because prevention of information leakage is highly required. In the notification processing, not only display of the message but also display of a mark or notification by sound may be performed.

Figure 6B:
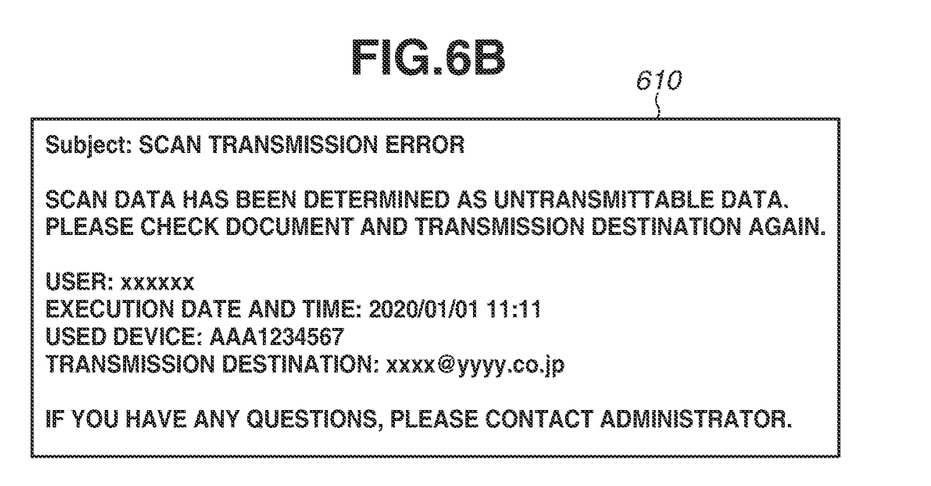

In the notification processing, as illustrated in another example of FIG. 6B, the user may be notified of an error content 610 by an e-mail. In this case, the censorship result determination unit 320 checks the current user to the authentication control unit 322, and acquires a mail address of the user from the user data management unit 321. The e-mail transmitted through the communication control unit 317 notifies the user that the scan data is not transmittable.

Notification on the screen and notification by mail transmission may be used together. More specifically, the error screen 600 may be displayed on the operation unit 130 until the user logs off, and after the user logs off, it may be determined that the user is absent in front of the image forming apparatus 100, and the notification by the e-mail to the user may be performed. Even in this case, the scan data is not transmitted.

Figure 5B:
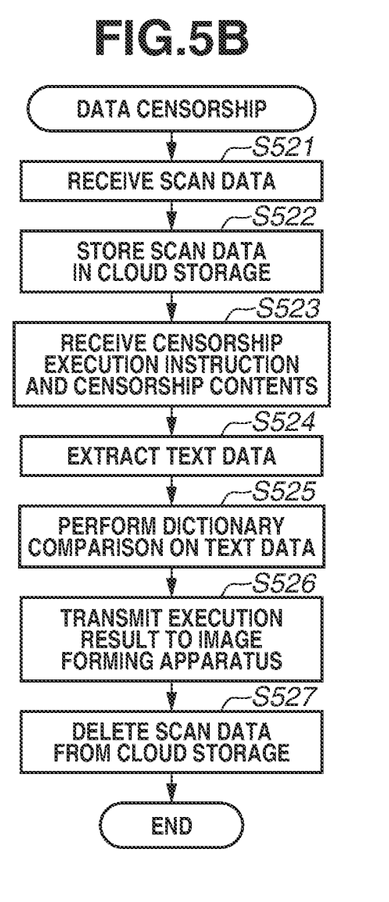

FIG. 5B is a flowchart illustrating the data censorship processing performed by the data censorship service 400.

In step S521, the communication control unit 405 receives the scan data from the image forming apparatus 100. In step S522, the user data management unit 404 stores the received data in the cloud storage. The received data is stored in the above-described specific area. The cloud storage may include the storage area in the server apparatus 180, or the entity of the cloud storage may be included in the cooperating cloud service 200.

In step S523, a censorship processing execution instruction and censorship contents are received from the image forming apparatus 100. In the present exemplary embodiment, the censorship contents are received from the image forming apparatus 100, but the censorship contents may be previously set in the cloud service 200.

In step S524, optical character recognition (OCR) is performed on the scan data acquired in step S521 to extract character strings (text data) from the scan data. In step S525, the data censorship processing unit 402 performs data censorship. The data censorship processing unit 402 compares the extracted character strings with a censorship dictionary, and checks whether the extracted character strings include any of the censorship keywords. At least one censorship keyword is registered in the censorship dictionary by dictionary registration (described below with reference to FIG. 7). The censorship dictionary is managed by the censorship setting management unit 403. In the present exemplary embodiment, the OCR of the scan data is performed in the cloud service 200. Alternatively, after the OCR is performed in the image forming apparatus 100, only the text data may be transmitted to the cloud service 200.

In step S526, a result of the data censorship about whether a character string coincident with any of the censorship keywords is present in the extracted character strings (whether extracted character strings include any of censorship keywords) in step S525 is transmitted to the image forming apparatus 100. More specifically, the data censorship processing unit 402 transmits the result of the data censorship to the image forming apparatus 100 through the communication control unit 405. As the result of the data censorship, the severity "low" indicating that no censorship keyword is included, the severity "high" indicating that the censorship keywords are included at a high rate, or the severity "middle" indicating that some censorship keywords are included is transmitted. In the present exemplary embodiment, any of the three levels of "low", "middle", and "high" corresponding to the rate of the censorship keywords included is notified as the result, but the levels may be subdivided based on the number of times of appearance of the censorship keywords or likelihood of the character strings.

In step S527, the censored scan data is deleted from the cloud storage.

Jobs other than the copy job, the scan transmission job, the FAX transmission job, and the BOX storage job may be handled as targets of the censorship by the cloud service. In a case where any of the other jobs is input, processing corresponding to the input job is performed.

Figure 9:
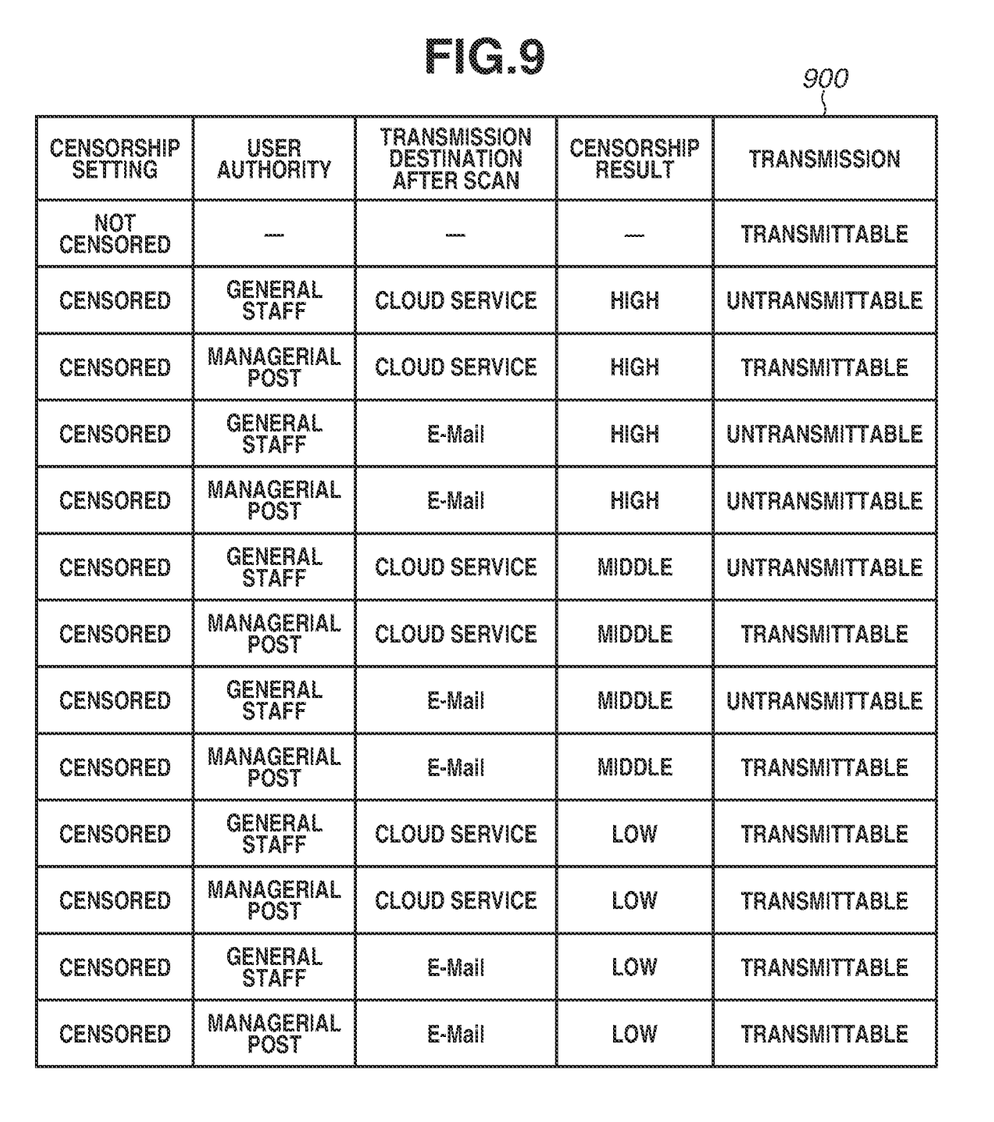
FIG. 9 is an exemplary table to be used when transmission propriety is determined based on a censorship result.

A determination table 900 used by the censorship result determination unit 320 to determine transmission propriety in step S507 is to be described with reference to FIG. 9.

The determination table 900 includes not only the censorship result but also elements such as the user authority of the user and a transmission destination of the scan data, and transmission propriety is determined by using all of the elements. For example, in a case where the censorship result is the severity "low" and e-mail transmission is performed, the scan data is determined to be transmittable. In a case where the censorship result is the severity "high", variations of the determination can be previously set, for example, the scan data is determined to be transmittable when the user authority is managerial post, and the scan data is determined to be not transmittable when the user authority is general staff. This enables more flexible determination of the transmission propriety. The determination table described here is illustrative, and the transmission propriety may be determined based on elements, for example, a transmission protocol, an installation place of the device, and a format of the file.

Figure 7:
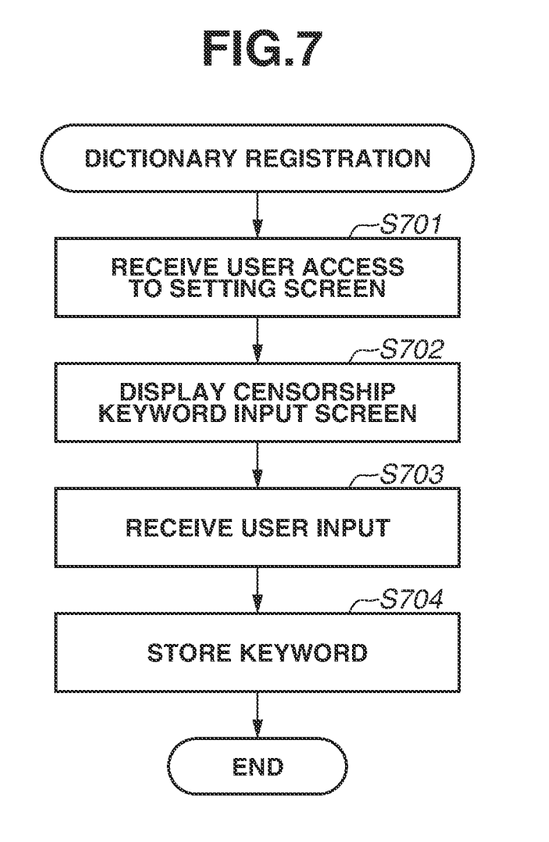
FIG. 7 is an exemplary flowchart illustrating dictionary registration processing.

FIG. 7 is a flowchart illustrating the dictionary registration processing. The processing is realized when the CPU 111 loads programs stored in the flash memory 114 to the RAM 113 and executes the programs. The processing starts when an instruction to perform dictionary registration is input from the user through the operation unit 130.

When the instruction to perform the dictionary registration is input, a setting screen is displayed. The setting screen is displayed on the operation unit 130 or on a web browser provided in the PC 190 by the web server function.

In step S701, the censorship setting management unit 318 waits for the user to access the setting screen. When the user accesses the setting screen, the censorship setting management unit 318 displays a censorship keyword input screen 800 illustrated in FIG. 8, on the operation unit 130 in step S702. A keyword list display field 801, a keyword input reception field 802, an OK button 803, and a cancel button 804 are displayed in the censorship keyword input screen 800 illustrated in FIG. 8. Other than the above, operations corresponding to the censorship result of the scan data and the censorship character strings may be set for each user or each group.

Figure 8:
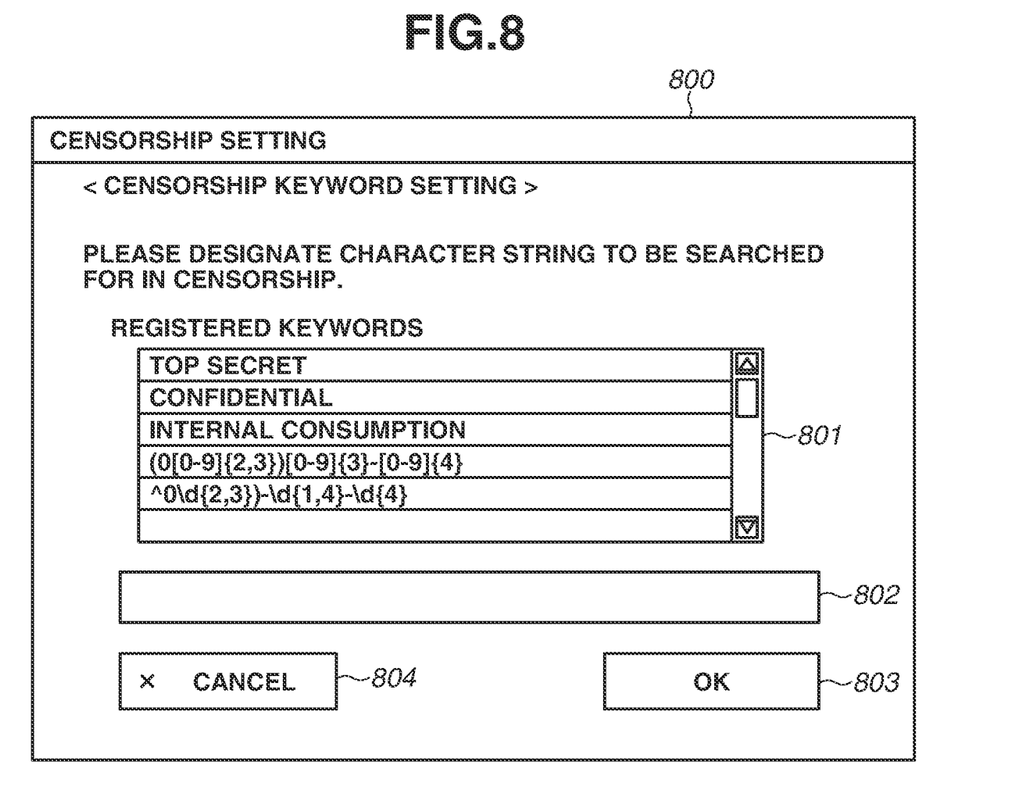
FIG. 8 is an exemplary diagram illustrating a censorship keyword input screen.

In step S703, the censorship setting management unit 318 receives input of the censorship keywords from the user on the censorship keyword input screen 800. In step S704, the censorship setting management unit 318 stores the input censorship keywords in the HDD 115. The processing illustrated in FIG. 7 then ends. When the processing illustrated in FIG. 7 is performed while the registered censorship keywords are present, the registered contents of the censorship keywords are updated. The censorship in the above-described determination processing is performed by using the latest censorship keywords.

In a case where a character string coincident with any of the censorship keywords is present in the extracted character strings, an error is notified in step S509. This makes it possible to notify the user that the scan data is not transmittable in terms of prevention of information leakage.

Execution necessity/unnecessity of the censorship can be set by on/off setting of the censorship mode, and the determination processing is performed based on a condition that the execution of the censorship mode is set to be necessary. As a result, storage and output of data having no possibility of information leakage can be smoothly processed.

In the flowchart illustrated in FIGS. 5A and 5B, the censorship is performed only on the job including scan and transmission, but even in a case where the job does not include transmission, such as a copy job and a BOX storage job, DLP may be performed in the cloud storage. In the following, the case of the copy job is to be described. To perform the DLP on the copy job in the cloud storage, the processing in steps S503 to S506 is performed. In step S507, printing propriety is determined based on the execution result of the DLP. In step S508, it is checked whether the scan data is printable. In a case where the scan data is printable (YES in step S508), the scan data is printed in step S509.

In a case where the scan data is not printable (NO in step S508), an error is displayed in step S510. The determination whether the scan data is printable may be performed in the cloud service.

In the above-described exemplary embodiment, after the censorship of the scan data ends, the scan data stored in the cloud storage is deleted. However, in a case where the user wants to store the data in the cloud storage or in a case where the cloud service 200 provides a function of data transmission, the data stored in the cloud service is preferably effectively used. Accordingly, in a second exemplary embodiment, the cloud service 200 transmits the file.

Figure 10:
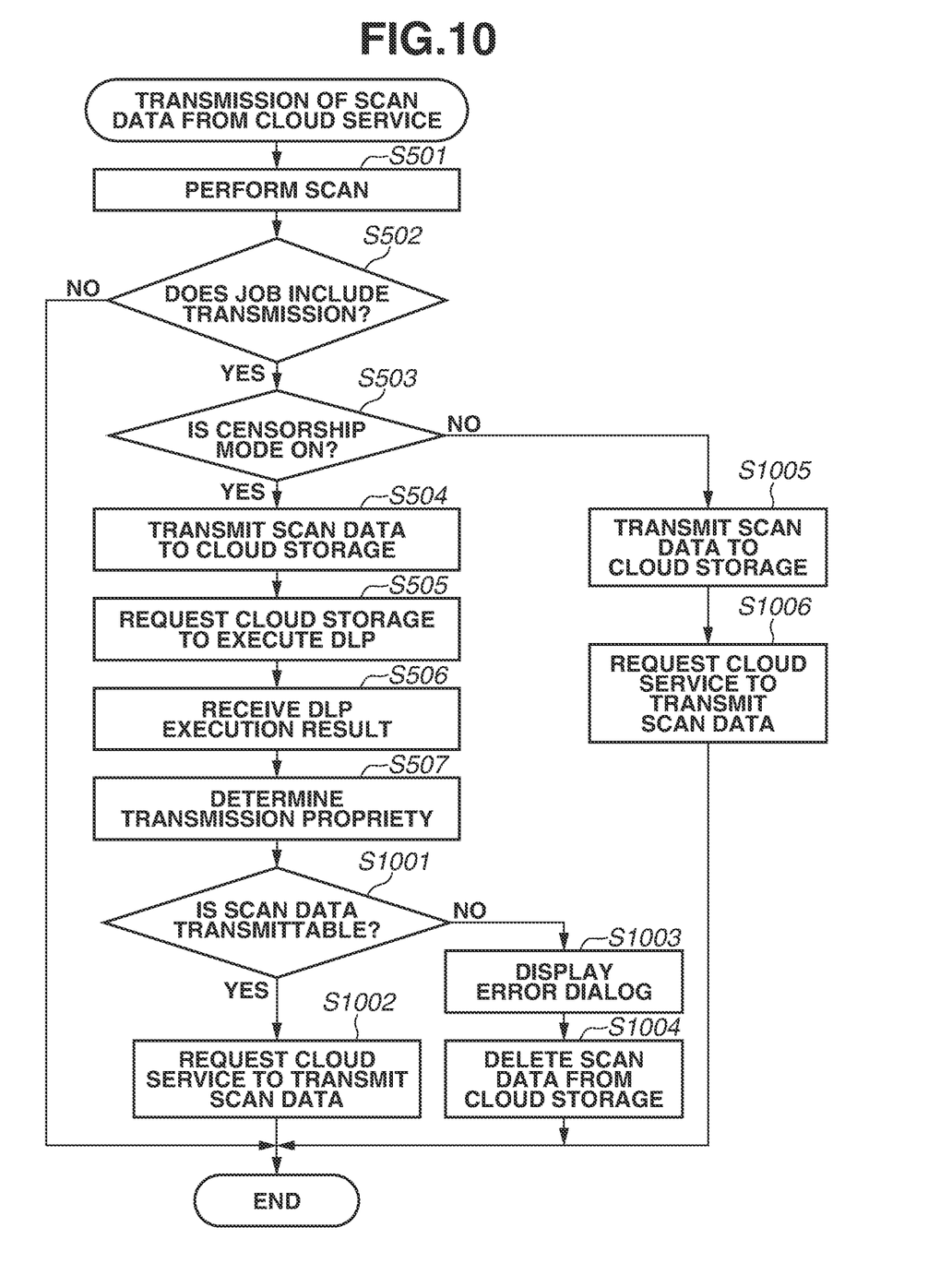
FIG. 10 is an exemplary flowchart illustrating the data censorship processing.

FIG. 10 is a flowchart of processing to transmit the scan data stored in the cloud storage to outside through the cloud service.

Processing in steps S501 to S507 is similar to the processing in FIG. 5A. Accordingly, descriptions of the processing are omitted.

In step S1001, in a case where it is determined in step S507 that the scan data is transmittable (YES in step S1001), the processing proceeds to step S1002. In step S1002, the cloud service 200 is requested to transmit the scan data already stored in the cloud storage to a designated transmission destination. In a case where the scan data is not transmittable (NO in step S1001), an error dialog is displayed in step S1003. In step S1004, the scan data is deleted from the cloud storage. More specifically, the cloud storage is requested to delete the scan data.

In a case where the censorship mode is off (NO in step S503), the scan data is transmitted to the cloud storage in step S1005. In step S1006, the data is transmitted to the designated transmission destination from the cloud service 200 in a manner similar to step S1002.

In a case where the user wants to store the scan data in the cloud storage, the transmission request is not issued in step S1002 or step S1006, but the scan data is stored in a desired storage.

When the data is stored in the cloud storage, the data can be accessed from the PC 190 and the scan data before the censorship can be accessed, which is unpreferable. For this reason, at a timing when the scan data is transmitted to the cloud service 200 and is stored in the cloud service 200 in step S504, a nondisclosure flag is preferably set. Setting the nondisclosure flag makes it possible to prevent the other persons from accessing the scan data. Processing to put the scan data in a disclosed state may be performed in step S1002.

According to the present exemplary embodiment, it is possible to achieve effects similar to the effects by the above-described exemplary embodiment in terms of enhancement of the information leakage prevention effect about the scan data. The scan data stored in the cloud service 200 can be efficiently used.

In the above-described plurality of exemplary embodiments, the image forming apparatus 100 consistently performs the processing to determine the transmission propriety. However, in a case where the cloud service 200 constantly cooperating with the image forming apparatus 100 is provided, determination of the transmission propriety by the cloud service 200 is more efficient. For this reason, in a third exemplary embodiment, it is assumed that the image forming apparatus 100 can communicate with a first cloud service (management server) 200 performing management, transmission, and the like of data, and a second cloud service (censorship server) 200 providing a data censorship service. A method by which the image forming apparatus 100 transmits the scan data to the management server, and further transmits the scan data to the censorship server to perform data censorship is to be described. The management server and the censorship server indicate cloud services providing the above-described respective services.

Figure 11A:
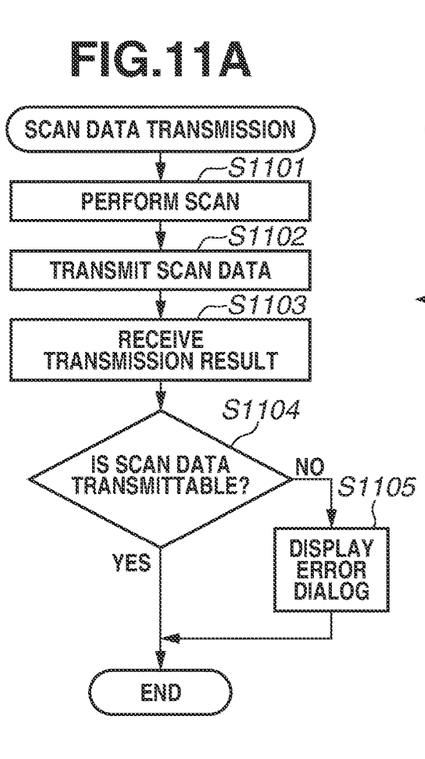
FIGS. 11A and 11B are exemplary flowcharts illustrating the data censorship processing.

FIG. 11A is a flowchart illustrating processing in which the image forming apparatus 100 transmits the scan data to the first cloud service 200.

In step S1101, the image forming apparatus 100 scans a document. In step S1102, the image forming apparatus 100 transmits scan data to the first cloud service 200. In step S1103, the image forming apparatus 100 receives notification of transmission propriety from the first cloud service 200. In step S1104, the transmission propriety is checked. In a case where the scan data is transmittable (YES in step S1104), the processing ends. In a case where the scan data is not transmittable (NO in step S1104), an error is displayed in step S1105.

Figure 11B:
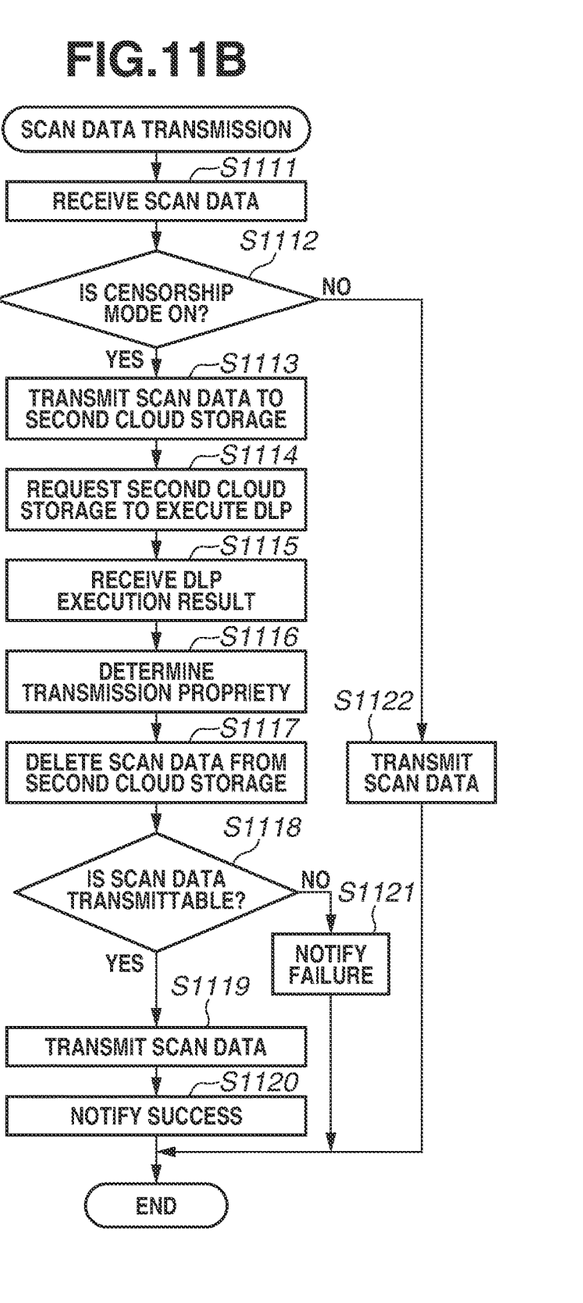

FIG. 11B is a flowchart illustrating processing in which the first cloud service 200 determines the transmission propriety of data.

In step S1111, the scan data and information on a transmission destination designated by the user are received from the image forming apparatus 100.

Processing in steps S1112 to S1116 is similar to the processing in steps S503 to S507. Accordingly, descriptions of the processing are omitted.

In step S1117, the scan image is deleted from a second cloud storage. More specifically, the second cloud storage is requested to delete the scan data.

In a case where the scan data is transmittable in step S1118 (YES in step S1118), the scan data is transmitted to the transmission destination designated by the user in step S1119. In step S1120, the image forming apparatus 100 is notified of transmission success. It is assumed that the transmission destination is designated by a mail address or a telephone number, but the scan data may be transmitted to a designated talk room of a chat application or the like. In a case where the scan data is not transmittable (NO in step S118), the image forming apparatus 100 is notified of transmission failure in step S1121.

In a case where the censorship mode is set to off (NO in step S1112), the scan data is transmitted to the transmission destination designated by the user in step S1122.

Operation by the second cloud service 200 is similar to the operation by the cloud service 200 in the first exemplary embodiment. Accordingly, descriptions of the operation are omitted.

According to the present exemplary embodiment, it is possible to achieve effects similar to the effects by the above-described exemplary embodiments by causing the management server managing the data and the censorship server providing the data censorship service to cooperate with each other, in terms of enhancement of the information leakage prevention effect about the scan data.

When the cloud service 200 collectively performs the processing up to the determination of the transmission propriety, it is possible to use a large number of resources as compared with the image forming apparatus 100, which makes it possible to complete the processing in a short time.

The present disclosure is described in detail based on the preferred exemplary embodiments, but the present disclosure is not limited to these specific exemplary embodiments, and various modes without departing from the spirit of the present disclosure are also included in the present disclosure. The above-described exemplary embodiments may be partially combined as appropriate.

As described above, it is possible to provide the mechanism that enables the image processing apparatus or the information processing apparatus to use the censorship result in the image acquired by reading a display medium. It is possible to control the job to transmit the scan image corresponding to the installation environment of the image processing apparatus and the user authority of the login user based on the result of the censorship by the server.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-187835, filed Nov. 18, 2021, which is hereby incorporated by reference herein in its entirety.

What is claimed is:

1. An image processing apparatus communicable with a system including a censorship function, the image processing apparatus comprising:
one or more controllers having one or more processors and one or more memories, the one or more controllers configured to:
transmit an image acquired by reading a display medium to the system;
receive a censorship result from the system;
control the image processing apparatus to perform a predetermined operation corresponding to the received censorship result; and
transmit a request to delete the image to the system, in a case where the predetermined operation corresponding to the received censorship result is set to be not transmittable,
wherein the predetermined operation is a preset operation to be performed by the image processing apparatus based on the received censorship result.

2. The image processing apparatus according to claim 1, wherein the one or more controllers are configured to transmit the image to a transmission destination, and
wherein the predetermined operation is set based on the transmission destination.

3. The image processing apparatus according to claim 1, wherein the one or more controllers are configured to perform authentication of a login user, and
wherein the predetermined operation is set based on user authority of the login user.

4. The image processing apparatus according to claim 1, wherein the one or more controllers are configured to:
transmit the image to a transmission destination; and
perform processing to transmit the image to the transmission destination in a case where the predetermined operation corresponding to the received censorship result is set to be transmittable.

5. The image processing apparatus according to claim 1, wherein the one or more controllers are configured to:
print the image; and
perform processing to print the image in a case where the predetermined operation corresponding to the received censorship result is set to be printable.

6. The image processing apparatus according to claim 1, further comprising a display unit configured to display a screen,
wherein the one or more controllers are configured to display a message that the image is not printable on the display unit in a case where the predetermined operation corresponding to the received censorship result is set to be not printable.

7. The image processing apparatus according to claim 6, wherein the predetermined operation is set on a setting screen displayed on the display unit.

8. The image processing apparatus according to claim 1, wherein the system including the censorship function includes one or a plurality of servers.

9. The image processing apparatus according to claim 1, further comprising an extraction unit configured to extract text data from the image,
wherein the one or more controllers are configured to transmit the text data extracted by the extraction unit to the system.

10. The image processing apparatus according to claim 1, wherein the display medium is a sheet.

11. A method of controlling an image processing apparatus communicable with a system including a censorship function, the method comprising:
transmitting an image acquired by reading a display medium to the system;
receiving a censorship result from the system;
transmit a request to delete the image to the system, in a case where the predetermined operation corresponding to the received censorship result is set to be not transmittable; and
controlling the image processing apparatus to perform a predetermined operation corresponding to the received censorship result.

12. A non-transitory computer-readable storage medium that stores a program for causing a computer to execute the a control method for an image processing apparatus communicable with a system including a censorship function, the method comprising:
transmitting an image acquired by reading a display medium to the system;
receiving a censorship result from the system;
transmit a request to delete the image to the system, in a case where the predetermined operation corresponding to the received censorship result is set to be not transmittable; and
controlling the image processing apparatus to perform a predetermined operation corresponding to the received censorship result.

13. The image processing apparatus according to claim 1, wherein the request to delete the image is transmitted to the system after the predetermined operation corresponding to the received censorship result is performed.

* * * * *